G. J. DYKES.
Vehicle-Axle Nut.

No. 212,842. Patented Mar. 4, 1879.

Attest:
J. H. Lumpkin
S. A. McArthur

Inventor:
G. J. Dykes

UNITED STATES PATENT OFFICE.

GEORGE J. DYKES, OF FLOYD COUNTY, GEORGIA.

IMPROVEMENT IN VEHICLE-AXLE NUTS.

Specification forming part of Letters Patent No. 212,842, dated March 4, 1879; application filed August 1, 1878.

*To all whom it may concern:*

Be it known that I, GEORGE JACKSON DYKES, of the county of Floyd and State of Georgia, have invented a new and useful Improvement in Carriage-Axle Nuts, of which the following is a specification:

The invention relates to nuts for the axles of pleasure-carriages and all other vehicles.

Heretofore, as usually constructed, the wheels of common vehicles have been fastened on their axles by a screw cut on the end of the axle, and a nut threaded to fit thereon, screwing onto the end of the axle as far as the screw extends, just leaving the wheel free to revolve on the journal-arm. This plan is objectionable, because the box will wear and become loose, allowing the wheel to have end-play between the box and nut, producing a rattling noise, and, besides, subjecting the wheel to considerable strain. This end-play has been remedied by putting washers between the nut and end of the box; but it is difficult to size the washer to just fill up the space.

The object of my invention is to provide an adjustable nut with two or four thick sides, through which two or four set-screws are tapped, to vary the thickness of the nuts, according to the kind of vehicle on which they are to be used, the two or four set screws operating against a washer placed between the nut and end of the box.

By my invention any wear allowing the end-play of the wheel may be taken up at will and without much trouble.

Figure 2:
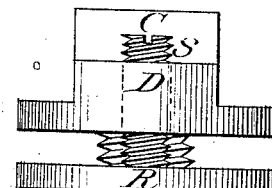
Figure 3:
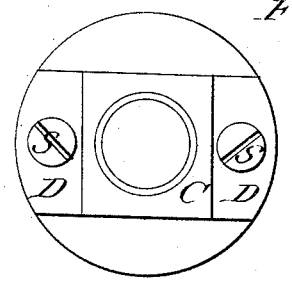
Figure 4:
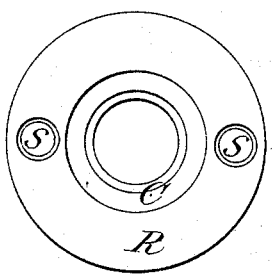
Figure 5:
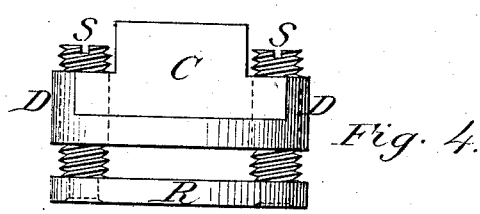
Figure 1:
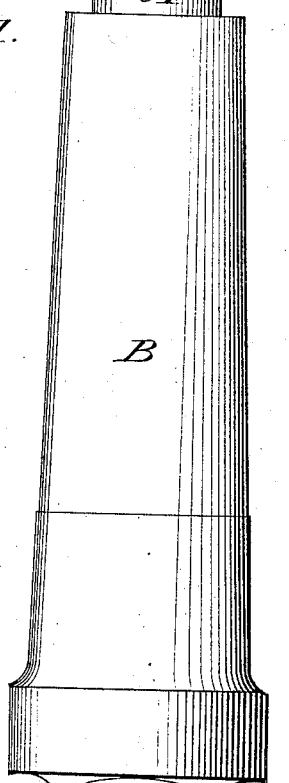

In the accompanying drawings, in which like letters of reference indicate like parts, Figure 1 is a side elevation of a carriage axle and box having my improved axle-nut applied thereto. Fig. 2 is a top plan; Fig. 3, a bottom plan; and Figs. 4 and 5 are side elevations of the axle-nut.

A is an axle, and B a box, of the usual construction. The axle A has a threaded end portion, and C is a nut fitting thereon. The nut has two, three, or four projections or thickened parts, as the size of vehicle may require, through which are tapped two, three, or four set-screws, S S. R is an annular washer adapted to fit on the end of the axle and bear against the end of hub-box B. The ends of the set-screws bear against the washer, so that by means of the set-screws and washer the end-play of the box may be readily taken up. I prefer to reduce the ends of the screws and fit them in holes in the washer, so that the parts may be held together and properly kept in place.

What I claim is—

The combination of the axle A, having the threaded end portion. the nut C, with thickened parts, set-screws S S, and annular washer R, all substantially as herein set forth.

GEORGE JACKSON DYKES.

Witnesses:
  SAMUEL JOHNSTON,
  J. R. TOWERS.